US006906931B1

(12) United States Patent
Batarseh et al.

(10) Patent No.: US 6,906,931 B1
(45) Date of Patent: Jun. 14, 2005

(54) ZERO-VOLTAGE SWITCHING HALF-BRIDGE DC-DC CONVERTER TOPOLOGY BY UTILIZING THE TRANSFORMER LEAKAGE INDUCTANCE TRAPPED ENERGY

(75) Inventors: Issa Batarseh, Orlando, FL (US); Hong Mao, Orlando, FL (US); Jaber Abu Qahouq, Orlando, FL (US)

(73) Assignee: Astec International Limited, Kowloon (HK)

(*) Notice: Subject to any disclaimer, the term of this patent is extended or adjusted under 35 U.S.C. 154(b) by 0 days.

(21) Appl. No.: 10/769,705

(22) Filed: Jan. 30, 2004

(51) Int. Cl.$^7$ .................. G05F 3/335; G05F 7/5387
(52) U.S. Cl. .................................... 363/17; 363/132
(58) Field of Search .................. 363/16, 17, 56.01, 363/56.02, 56.05, 95, 97, 131, 132

(56) References Cited

U.S. PATENT DOCUMENTS

| | | | |
|---|---|---|---|
| 4,860,184 A | * 8/1989 | Tabisz et al. ................ 363/17 |
| 5,008,795 A | 4/1991 | Parsley et al. |
| 5,508,903 A | 4/1996 | Alexndrov |
| 5,774,346 A | * 6/1998 | Poon et al. ................ 363/17 |
| 5,808,879 A | 9/1998 | Liu et al. |
| 5,933,338 A | 8/1999 | Wallace |
| 6,163,466 A | 12/2000 | Davila, Jr. et al. |
| 6,388,898 B1 | 5/2002 | Fan et al. |
| 6,400,582 B1 | 6/2002 | Hemena et al. |
| 6,538,905 B2 | 3/2003 | Greenfeld et al. |
| 6,549,436 B1 | 4/2003 | Sun |
| 6,567,284 B2 | * 5/2003 | Huang ........................ 363/98 |
| 6,650,551 B1 | * 11/2003 | Melgarejo ................... 363/16 |
| 6,791,851 B2 | * 9/2004 | Brkovic ................... 363/56.03 |
| 6,836,414 B1 | * 12/2004 | Batarseh et al. ............. 363/17 |
| 2003/0174521 A1 | 9/2003 | Batarseh et al. |

FOREIGN PATENT DOCUMENTS

JP 11055941 2/1999

OTHER PUBLICATIONS

Sabaté, J.A. et al., "Design Considerations For High–Voltage High–Power Full–Bridge Zero–Voltage–Switched PWM Converter", Applied Power Electronics Conference and Exposition, 1990, APEC '90, pp. 275–284.

Redi, Richard et al., "A Novel Soft–Switching Full–Bridge DC/DC Converter: Analysis, Design Considerations, and Experimental Results at 1.5 kW, 100 kHs", IEEE Power Electronics Specialists Conference Records, 1990, pp. 162–172.

Chen, W. et al., "A Comparative Study Of A Class Of Full Bridge Zero–Voltage–Switched PWM Converters", IEEE Applied Power Electronics Conference Proceedings, 1995, pp. 893–899.

(Continued)

Primary Examiner—Matthew V. Nguyen
(74) Attorney, Agent, or Firm—Harness, Dickey & Pierce, P.L.C.

(57) ABSTRACT

A duty-cycle-shifted pulse-width modulation controlled half-bridge zero-voltage switching DC—DC converter has a primary side, a secondary side and a transformer coupling the primary side to the secondary side. The primary side has first and second primary switches coupled to a primary winding of the transformer and an auxiliary branch having one side coupled to a junction of the first and second primary switches and a second side coupled to common. The auxiliary branch includes a grounded auxiliary switch that is switched on when one of the first and second primary switches is on to trap leakage inductance energy of the transformer when that primary switch is turned off and thereafter switched off to release the trapped leakage inductance energy to provide a zero voltage switching condition for the other primary switch. The one of the first and second primary switches that is on when the auxiliary switch is switched on may be controlled with duty-cycle-shifted pulse width modulation to provide a zero current switching condition for that primary switch.

23 Claims, 8 Drawing Sheets

OTHER PUBLICATIONS

Sebastian, J. et al., "An Overall Study Of The Half–Bridge Complementary Control DC–To–DC Converter", Power Electronics Specialists Conference, 1995, pp. 1229–1235.

Miftakhutdinov, Rais et al., "Modified Asymmetrical ZVS Half–Bridge DC–DC Converter", Applied Power Electronics Conference and Exposition, 1999, APEC '99, pp. 567–574.

Chen, Weiyun et al., "The Optimization Of Asymmetric Half–Bridge Converter", Applied Power Electronics Conference proceedings, 2001, pp. 703–707.

Imbertson, Paul et al., "Asymmetrical Duty Cycle Permits Zero Switching Loss In PWM Circuits With No Conduction Loss Penalty", IEEE Transaction On Power Electronics, vol. 29, No. 1, pp. 121–125, 1993.

Feng, Jiangtao et al., "ZVS Analysis Of Asymmetric Half–Bridge Converter", Power Electronics Specialists Conference, 2001, pp. 243–247.

Ji, H.K. et al., "Active Clamp Forward Converter With MOSFET Synchronous Recitification", IEEE Power Electronics Specialists Conference, 1994, pp. 895–901.

Li, Qiong et al., "Design Considerations Of Transformer DC Bias Of Forward Converter With Active–Clamp Reset", Applied Power Electronics Conference and Exposition, 1999, APEC '99, pp. 553–559.

Mao, Hong et al., "A New Duty–Cycle–Shifted PWM Control Scheme For Half–Bridge DC–DC Converters To Achieve Zero–Voltage–Switching", Eighteenth Annual IEEE Applied Power Electronics Conference and Exposition, APEC, 2003, vol. 2, pp. 629–634.

Mao, Hong et al., "New Zero–Voltage–Switching Half–Bridge DC–DC Converter And PWM Control Method", Eighteenth Annual IEEE Applied Power Electronics Conference and Exposition, APEC 2003, vol. 2, pp. 635–640, Feb. 2003.

* cited by examiner (MODE 1)

(MODE 2)

(MODE 3)

(MODE 4)

(MODE 5)

(MODE 6)

(MODE 7)

(MODE 8)

(MODE 9)

ZVS of Switch S2 (Top: Vds (25V/div,))

Transformer Primary Voltage and Current

ZERO-VOLTAGE SWITCHING HALF-BRIDGE DC-DC CONVERTER TOPOLOGY BY UTILIZING THE TRANSFORMER LEAKAGE INDUCTANCE TRAPPED ENERGY

FIELD OF THE INVENTION

The present invention relates to DC—DC converters, and more particularly, to high-density, high-frequency, and high efficiency zero-voltage switching ("ZVS") half-bridge DC—DC converters.

BACKGROUND OF THE INVENTION

With the increasing demand for higher power density power conversion and better dynamic performance, the switching frequency in DC—DC converters continues to be increased to reduce the size and cost of passive components. Increased switching frequency causes increased component current stresses, voltage stresses and switching losses in pulse width modulated ("PWM") controlled DC—DC converters. ZVS DC—DC converters have lower switching loses because of the ZVS, and thus higher efficiency.

Among ZVS DC—DC converters, the phase-shifted ZVS full bridge is attractive because this allows all switches to operate at ZVS by utilizing the leakage inductance of the transformer and the junction capacitance of the MOSFET switches without adding an auxiliary switch to achieve ZVS. But the complexity of the full bridge is an impediment to its wide application, particularly for lower power levels. For lower power levels, the half-bridge is more attractive due to its simplicity compared to the full bridge.

Conventional symmetric PWM half-bridge DC—DC converters operate at a hard-switching condition. That is, the switches of the converters switch on when gated on regardless of whether the switches are in a zero voltage condition. During the off-time period of the two switches of the half-bridge, the oscillation between leakage inductance of the transformer and the junction capacitance results in energy dissipation and electromagnetic interference ("EMI") emissions. Hence, the conventional symmetric PWM half-bridge DC—DC converter is not a good candidate for use in DC—DC converters having higher switching frequencies.

One technique that has been proposed to soften the switching behavior of half-bridge switches is the use of complementary (asymmetric) duty cycle control of the switches. Because complementary drive signals are applied to the high side and low side switches, the two switches turn on during a zero voltage condition. After one switch is turned off, energy in the leakage inductance and reflected load current is utilized to charge the junction capacitance of that switch, discharge the junction capacitance of the second switch and force the body diode of the second switch to conduct to recycle energy once the junction capacitance of the second switch has been discharged to zero. During the period that the body diode of the second switch is conducting, the second switch can be turned on at a zero voltage condition.

Complementary duty cycle control in PWM half-bridge DC—DC converters has certain disadvantages. The asymmetric duty cycle for the two switches at static states leads to asymmetric voltage and current stresses on components. When the duty cycle is severely uneven, the current stress on the primary switches and the secondary rectifier(s) is significantly asymmetric. Voltage stress on the secondary side rectifier(s) is also uneven, resulting in degradation of the performance of the DC—DC converter unless higher voltage rated components are used. Moreover, because the power delivered in the two directions in the transformer is uneven, transformer utilization is degraded. Also, the DC gain ratio is nonlinear and a larger duty cycle variation is needed at the same input voltage variation in comparison with symmetric PWM controlled half-bridge DC—DC converters, which makes the DC—DC converter operate further beyond the optimum operating point at a typical input voltage. Hence, complementary (asymmetric) duty cycle control is more suitable for a fixed input voltage than a variable input voltage.

An asymmetric turns-ratio integrated-magnetic structure provides a solution to reduce the duty cycle variation for wide input variations so that a lower voltage rate rectifier can be used to improve performance. But the uneven power delivery in two transformers and the uneven current stress on the switches still present problems.

U.S. Ser. No. 10/272,719 titled "Half-Bridge Zero-Voltage-Switching (ZVS) Pulse Width Modulation (PWM) DC—DC Converted" filed on Oct. 17, 2002 discloses a ZVS half-bridge DC—DC converter based on duty-cycle-shifted (DCS) PWM control that achieves ZVS for all switches of the half-bridge DC—DC converter. The disclosure of U.S. Ser. No. 10/272,719 is incorporated by reference herein. By shifting the duty cycle of the PWM, one of the two main switches achieves ZVS utilizing the transformer leakage inductance and reflected load current for wide load variations. An ungrounded auxiliary switch, which operates at ZVS and zero-current-switching, in the primary of the half-bridge DC—DC converter provides for the use of the energy trapped in the leakage inductance to achieve ZVS of the second switch.

SUMMARY OF THE INVENTION

A half-bridge DC—DC converter in accordance with the invention has a primary side, a secondary side and a transformer coupling the primary side to the secondary side. The primary side has first and second primary switches coupled to a primary winding of the transformer and an auxiliary branch having one side coupled to a junction of the first and second -primary switches and a second side coupled to common. The auxiliary branch includes an auxiliary switch that is switched to a first state to trap leakage inductance energy of the transformer and switched off to release the trapped leakage inductance energy to provide a zero voltage switching condition for one of the first and second primary switches.

In an aspect of the invention, the auxiliary switch is switched on when one of the first and second primary switches is on to trap the leakage inductance energy when that primary switch is switched off. The auxiliary switch is thereafter switched off to release the trapped leakage inductance energy to provide the zero voltage switching condition for the other of the first and second primary switches. In an aspect of the invention, the primary switch that is on when the auxiliary switch is switched on is controlled by duty-cycle-shifted pulse width modulation to provide a zero voltage switching condition for that primary switch.

In an aspect of the invention, the auxiliary branch includes a diode in series with the auxiliary switch. In an aspect of the invention, the auxiliary branch includes a second auxiliary switch in series with the first auxiliary switch.

In an aspect of the invention, the primary switches are switched at high frequency. In an aspect of the invention, the primary switches have the same duty cycle.

In an aspect of the invention, the auxiliary switch is a grounded auxiliary switch.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
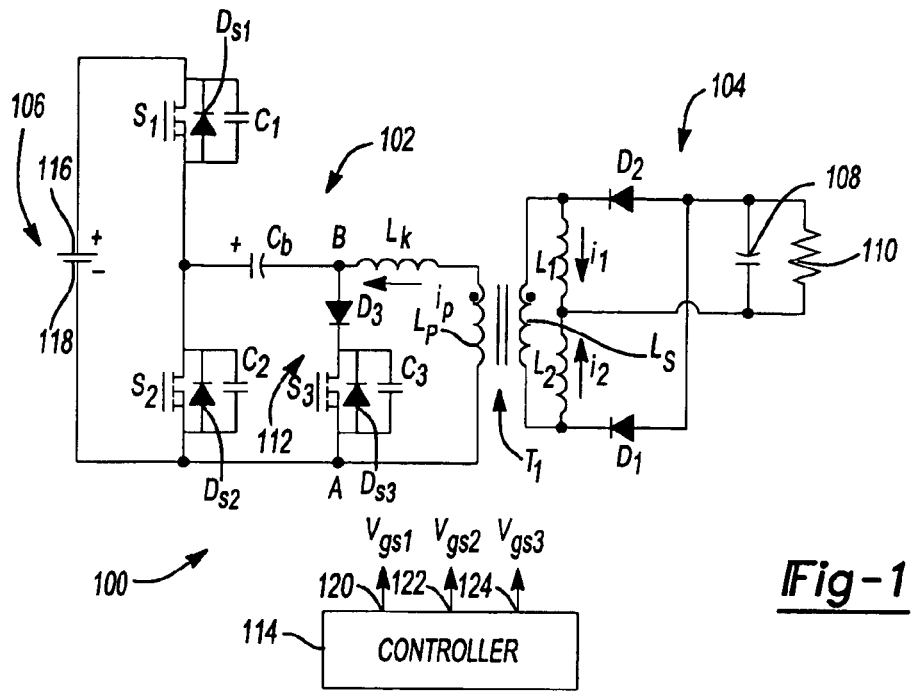
FIG. 1 is a circuit topology of a DCS half-bridge ZVS DC—DC converter in accordance with the invention.

FIG. 1 shows a circuit topology for a DCS half-bridge ZVS DC—DC converter 100 in accordance with an aspect of the invention. Half-bridge DC—DC converter 100 includes a primary side 102 and a secondary side 104. Primary side 102 includes primary or power switches $S_1$, $S_2$, capacitor $C_b$ and primary windings $L_p$ of a transformer $T_1$. Secondary side 104 of half-bridge DC—DC converter 100 includes secondary windings $L_s$ of transformer $T_1$, first and second inductors $L_1$, $L_2$, diodes $D_1$, $D_2$, filter capacitor 108 and output 110. Half-bridge DC—DC converter 100 also includes an auxiliary branch 112 in primary side 102. Auxiliary branch 112 includes auxiliary switch $S_3$ and diode $D_3$. Half-bridge DC—DC converter 100 also includes a controller 114 having outputs 120, 122, 124 coupled to switches $S_1$, $S_2$, $S_3$. Controller 114 generates the switching signals $V_{gs12}$, $V_{gs2}$, $V_{gs3}$ (FIG. 2) that switch switches $S_1$, $S_2$, $S_3$ on and off. Controller 114 can be any device that can generate the switching signals, such as a microcontroller, ASIC, or discrete electronic logic.

In an embodiment, half-bridge DC—DC converter 100 operates with high switching frequencies. That is, switches $S_1$ and $S_2$ are switched on and off at the high switching frequencies. As used herein, high switching frequencies means a switching frequency of 100 KHz or above. With today's semiconductors components, high switching frequencies are commonly understood to be in the range of 100 KHz to 2000 KHz. However, it should be understood that as semiconductor components are improved, it will be possible to use high switching frequencies above 2000 KHz. In an embodiment, half-bridge DC—DC converter 100 operates at a switching frequency of 400 KHz.

Switches $S_1$, $S_2$ and $S_3$ are illustratively FETs having drains, sources and gates. In an embodiment, switches $S_1$, $S_2$, and $S_3$ are MOSFETs. The drain of switch $S_1$ is coupled to a positive 118 of a DC source 106 of a DC input voltage and the source of switch $S_1$ is coupled to the drain of switch $S_2$ and to one side of capacitor $C_b$. The source of switch $S_2$ is coupled to common as is common 118 of DC source 106. The other side of capacitor $C_b$ is coupled to the anode of diode $D_3$ and to one side of a primary winding $L_p$ of transformer $T_1$. The other side of primary windings $L_p$ of transformer $T_1$. Is coupled to common. The cathode of diode $D_3$ is coupled to the drain of switch $S_3$ and the source of switch $S_3$ is coupled to common. Since the source of switch $S_3$ is coupled to common, auxiliary switch $S_3$ will sometimes be referred to as a grounded auxiliary switch. $C_1$, $C_2$ and $C_3$ represent the junction capacitances of switches $S_1$, $S_2$ and $S_3$, respectively. It should be understood that one or more external capacitors could also be coupled across the drain and source of each of switches $S_1$, $S_2$ and $S_3$, in which case $C_1$, $C_2$ and $C_3$ would represent the respective external capacitor(s) as well as the respective junction capacitance. Diodes $D_{s1}$, $Ds_{s2}$ and $D_{s3}$ represent the body diodes of switches $S_1$, $S_2$ and $S_3$, respectively. $L_k$ represents the leakage inductance of transformer $T_1$.

Secondary side 104 is illustratively a conventional current doubler rectification topology. In secondary side 104, the cathode of diode $D_1$ is coupled to one side of a secondary winding $L_s$ of transformer $T_1$ and to one side of inductor $L_2$. The other side of secondary winding $L_s$ is coupled to the cathode of diode $D_2$ and to one side of inductor $L_1$. The other sides of inductors $L_1$, $L_2$ are coupled to one side of filter capacitor 108 and one side of output 110. The other sides of filter capacitor 108 and output 110 are coupled to the anodes of diodes $D_1$ and $D_2$. It should be understood that diode $D_1$ and $D_2$ could be replaced by switches to reduce conduction losses, which is known as the synchronous rectifier technique. It should also be understood that topologies other than the conventional current doubler rectification topology could be used for secondary side 104, such as the center-tapped topology.

The DCS control scheme described in U.S. Ser. No. 10/272,719 and which is also briefly described below is used to achieve ZVS of one of the primary switches $S_1$, $S_2$ (illustratively $S_2$). DCS control involves shifting one of the two drive signals of the primary switches $S_1$ and $S_2$ close to the other, while keeping the PWM control mode. As a result, ZVS of one of the switches $S_1$, $S_2$ can be achieved because one of the switches $S_1$, $S_2$ turns on just after the other switch $S_1$, $S_2$ turns off. Since the pulse widths of the switches $S_1$, $S_2$ are equal, all corresponding components operate at conditions with even voltage and current stress as in the symmetric half-bridge DC—DC converter.

Figure 2:
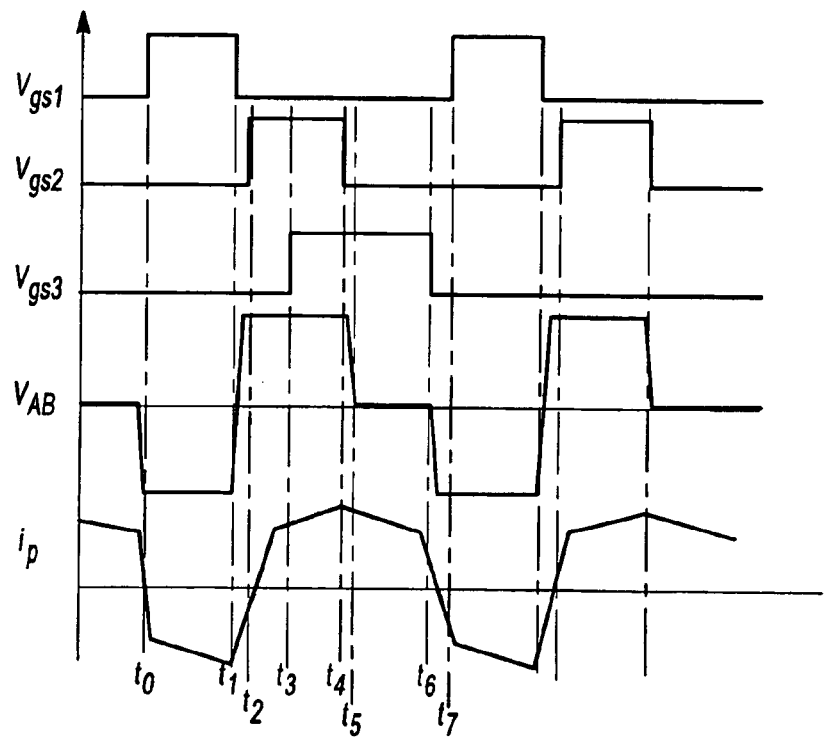
FIG. 2 are key waveforms of the operation of the half-bridge DC—DC converter of FIG. 1.
Figure 3A:
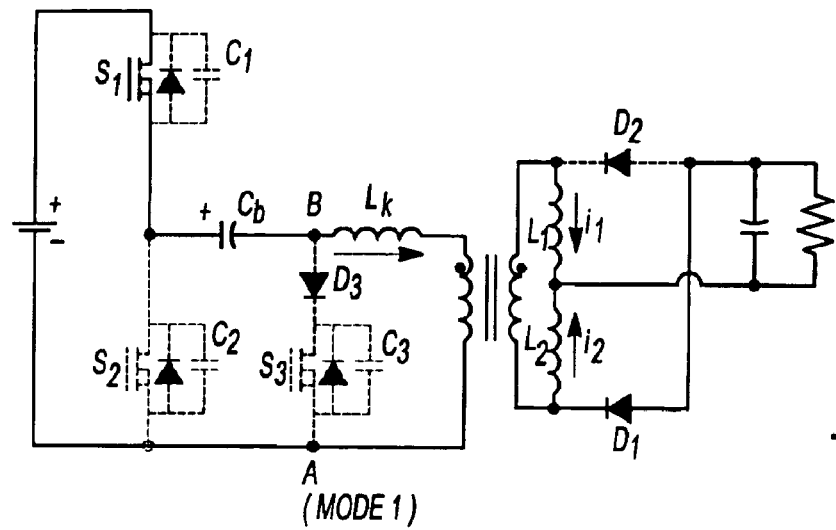
FIGS. 3A–3I are equivalent circuits showing the main operation modes of the half-bridge DC—DC converter of FIG. 1.
Figure 3B:
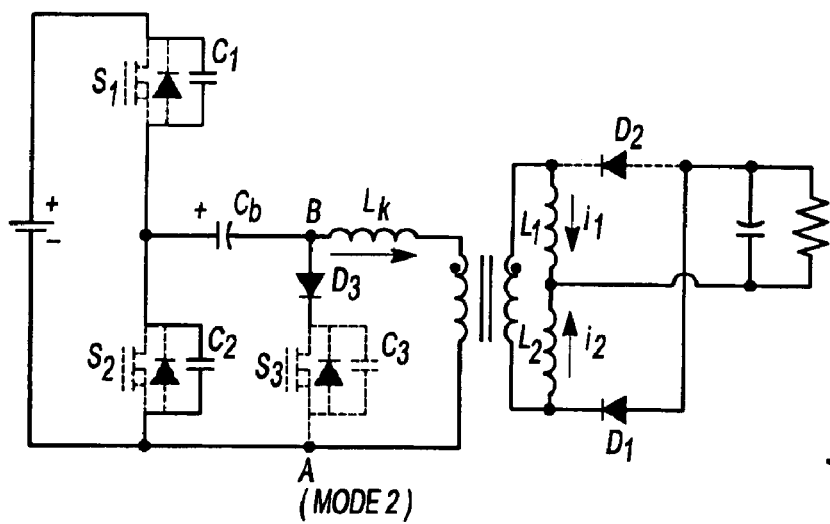
Figure 3C:
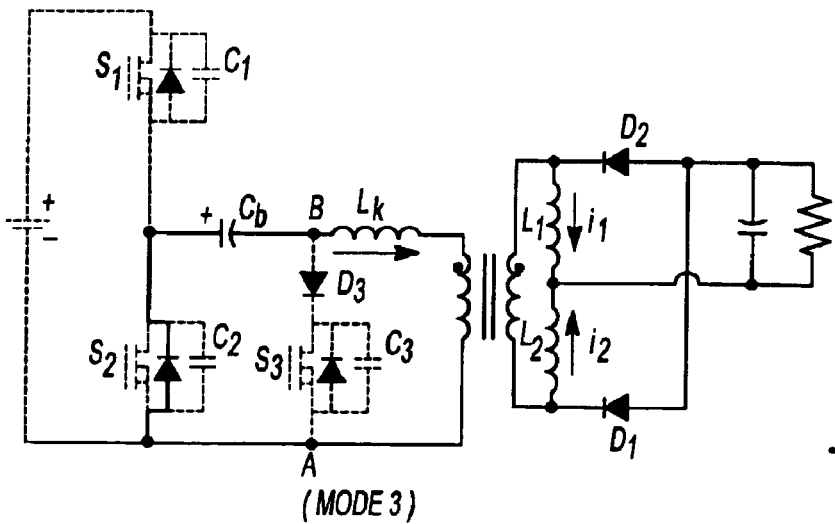
Figure 3D:
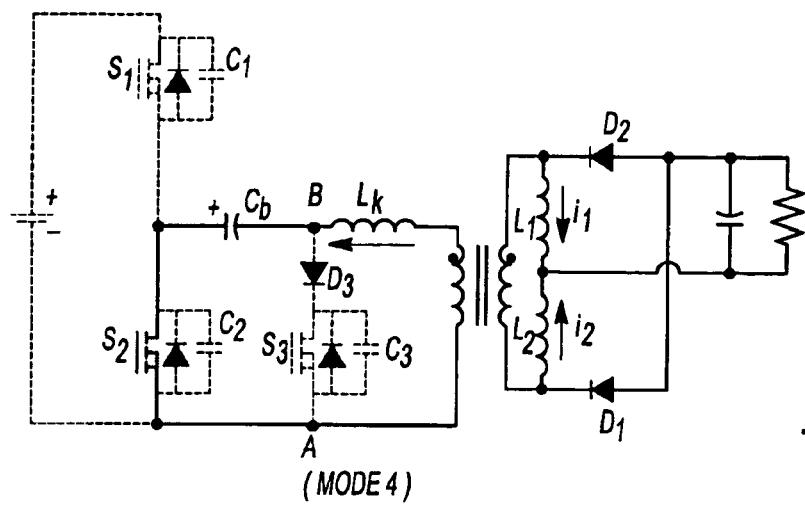
Figure 3E:
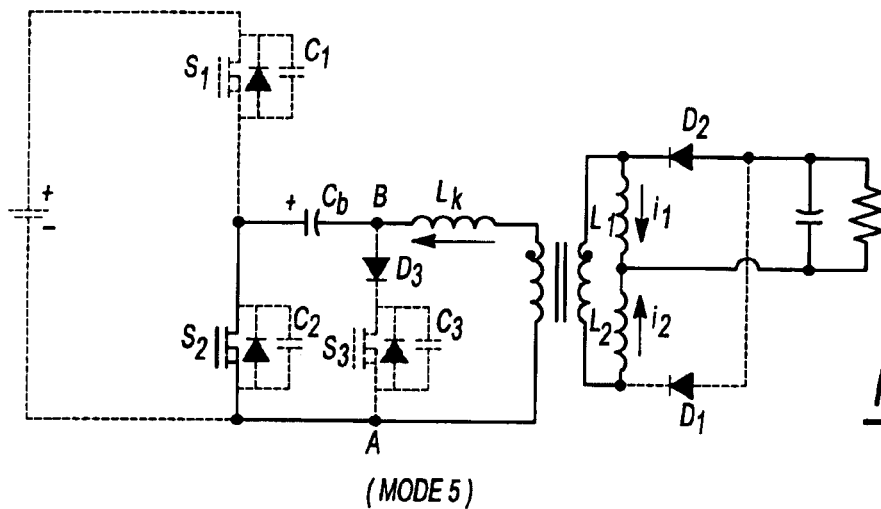
Figure 3F:
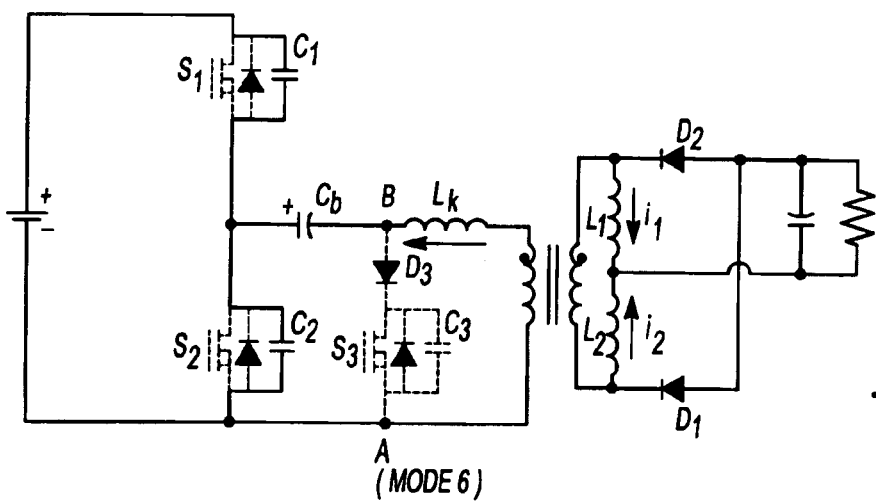
Figure 3G:
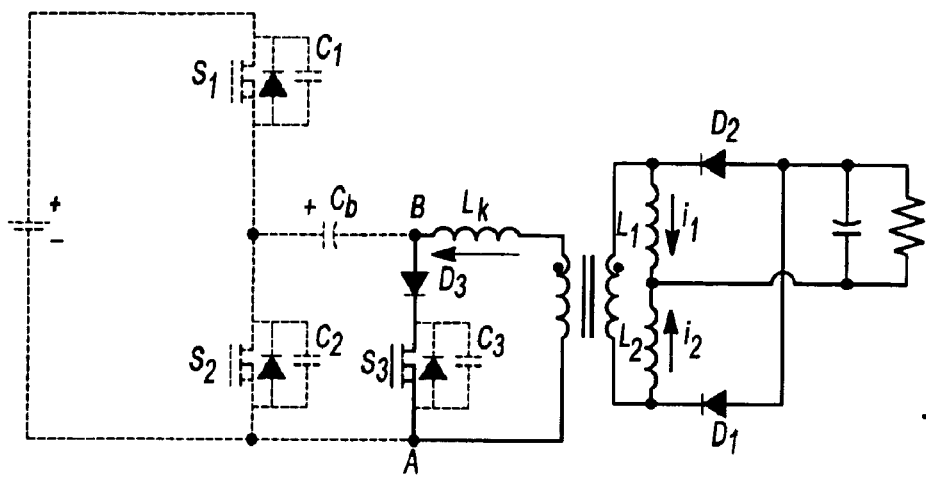
Figure 3H:
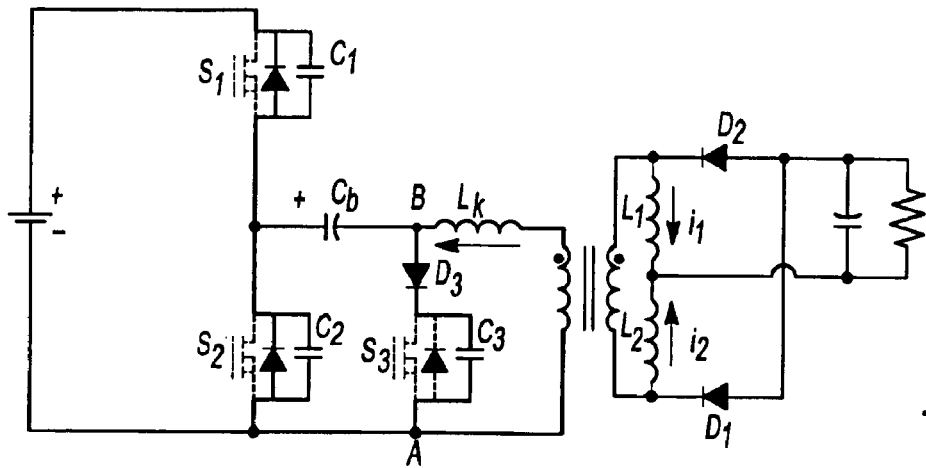
Figure 3I:
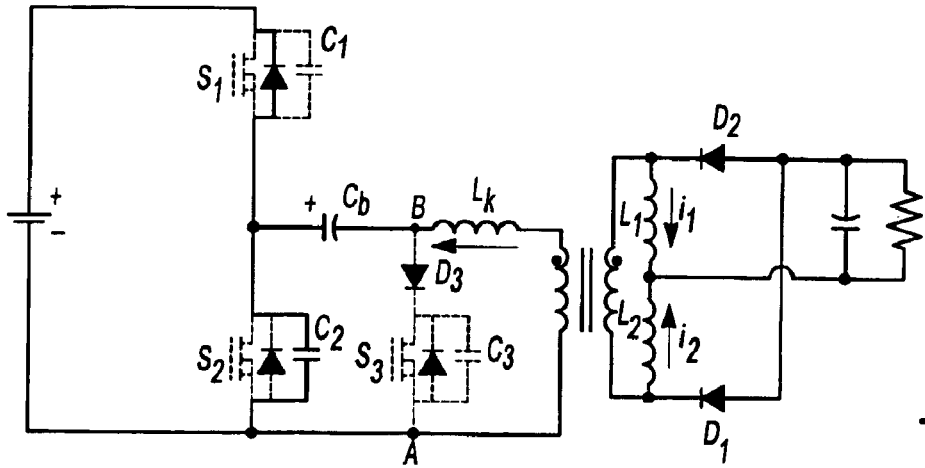

FIG. 2 shows the main operation waveforms of half-bridge DC—DC converter 100. The DCS control scheme is briefly described with reference to FIG. 2. The drive signal for switch $S_2(V_{gs2})$ is shifted left close to the falling edge of the drive signal for switch $S_1(V_{gs1})$ while keeping the same duty cycle for both switches $S_1$ and $S_2$. When switch $S_1$ turns off, the transformer $T_1$ primary current charges $C_1$ and discharges $C_2$. After $C_2$ discharges, the voltage across the drain-to-source of switch $S_2$ drops to zero and the body diode $D_{s2}$ of switch $S_2$ conducts to carry the current. While body diode $D_{s2}$ of switch $S_2$ is conducting, switch $S_2$ can be turned on with zero-voltage switching.

Auxiliary branch 112 is used to achieve ZVS for $S_1$ by trapping the energy in the leakage inductance of transformer $T_1$. During the interval when switch $S_2$ is on, the auxiliary switch $S_3$ is turned on at zero-current and ZVS. When switch $S_2$ is turned off, the leakage inductance current of transformer $T_1$ freewheels through auxiliary branch 112, that is, through diode $D_3$ and auxiliary switch $S_3$. Before switch $S_1$ is turned on, switch $S_3$ is turned off to release the leakage inductance energy to discharge $C_1$ so that switch $S_1$ can turn on at ZVS.

The operation of half-bridge DC—DC converter 100 is described in more detail with reference to the key operation waveforms shown in FIG. 2 and the equivalent circuits for main operation modes of half-bridge DC—DC converter 100 shown in FIGS. 3A–3I. For simplicity, the components of half-bridge DC—DC converter 100 are considered ideal except as otherwise indicated. In FIGS. 3A–3I, paths in which current is flowing are shown in solid and paths in which current is not flowing are shown in phantom. Switches $S_1$, $S_2$ and $S_3$ are shown in solid when they are on and in phantom when they are off. Controller 114, as mentioned above, generates switching signals $V_{gs1}$, $V_{gs2}$ and $V_{gs3}$ shown in FIG. 2 which gate switches $S_1$, $S_2$ and $S_3$, respectively, on and off.

Mode 1 (FIG. 3A) ($t_0<t<t_1$): At time $t=t_0$, switch $S_1$ is turned on with ZVS (the ZVS condition for turning switch $S_1$ on being provided by Mode 9 below). During the time interval of Mode 1, the transformer $T_1$ primary current $i_p$ is positive and the secondary side diode $D_2$ is reversed biased.

Mode 2 (FIG. 3B) ($t_1<t<t_2$): At time $t=t_1$, switch $S_1$ is turned off causing the current $i_p$ to charge $C_1$ and discharge $C_2$.

Mode 3 (FIG. 3C) ($t_1<t<t_2$): When the voltage across $C_2$ is discharged to zero, the body diode $D_{s2}$ of switch $S_2$ conducts which provides the ZVS condition for switch $S_2$. During this subinterval, the secondary side currents $i_1$ and $i_2$ freewheel through secondary side diodes $D_2$ and $D_1$, respectively.

Mode 4 (FIG. 3D) ($t_2<t<t_3$): Switch $S_2$ is turned on with ZVS at $t=t_2$, which causes the transformer $T_1$ leakage inductance current to be reset to zero and reverse-charge, while the secondary side inductor $L_1$, $L_2$ currents $i_1$ and $i_2$, respectively, continue to freewheel.

Mode 5 (FIG. 3E) ($t_2<t<t_4$): When the transformer $T_1$ primary current $i_p$ reaches the reflected current of secondary side current $i_2$, secondary side diode $D_1$ is blocked and inductor $L_2$ is charged. At time $t=t_3$, the switch $S_3$ is turned on with zero-current switching, because diode $D_3$ is reverse-biased. But no current flows through switch $S_3$ until switch $S_2$ is turned off and the voltage across $C_2$ is charged to the voltage across the capacitor $C_b$ (which occurs during Mode 7).

Mode 6 (FIG. 3F) ($t_4<t<t_5$): At time $t=t_4$, switch $S_2$ is turned off and the transformer $T_1$ primary current discharges $C_1$ while charging $C_2$.

Mode 7 (FIG. 3G) ($t_5<t<t_6$): At $t=t_5$, the voltage across $C_2$ is charged to the voltage across $C_b$, and then the leakage inductance current of transformer $T_1$ flows through $D_3$ and switch $S_3$. During this interval, the leakage current freewheels through $D_3$ and switch $S_3$ trapping the energy in the leakage inductance. On secondary side 104, inductor $L_1$ and $L_2$ currents $i_1$, $i_2$ freewheel through $D_2$ and $D_1$, respectively.

Mode 8 (FIG. 3H) ($t_6<t<t_7$): At $t=t_6$, switch $S_3$ is turned off, causing $C_2$ and $C_3$ to be charged and $C_1$ to be discharged by the leakage inductance current of transformer $T_1$.

Mode 9 (FIG. 3I) ($t_6<t<t_7$): When the voltage across $C_1$ is discharged to zero, the body diode $D_{s1}$ of switch $S_1$ conducts to recycle the energy in the transformer $T_1$ leakage inductance and provide the ZVS condition for switch $S_1$. Switch $S_1$ is then turned on in Mode 1 at ZVS as discussed above.

Half-bridge DC—DC converter 100 provides soft switching of the primary switches $S_1$, $S_2$ (as well as auxiliary switch $S_3$) and reduces leakage-inductance related losses. Since the high side primary switch $S_1$ and the low side primary switch $S_2$ of half-bridge DC—DC converter 100 have the same duty cycle width, the same stresses will be imposed on the transformer, switches, diodes and inductors of half-bridge-bridge converter 100 as are imposed on the components in a conventional symmetric half-bridge DC—DC converter.

Using grounded auxiliary switch $S_3$ simplifies the drive for switch $S_3$ compared with the ungrounded auxiliary switch topology disclosed in U.S. Ser. No. 10/272,719. The ungrounded auxiliary switch topology requires driving techniques, for floating switches which is obviated when the grounded auxiliary switch topology of the present invention is used.

Figure 4:
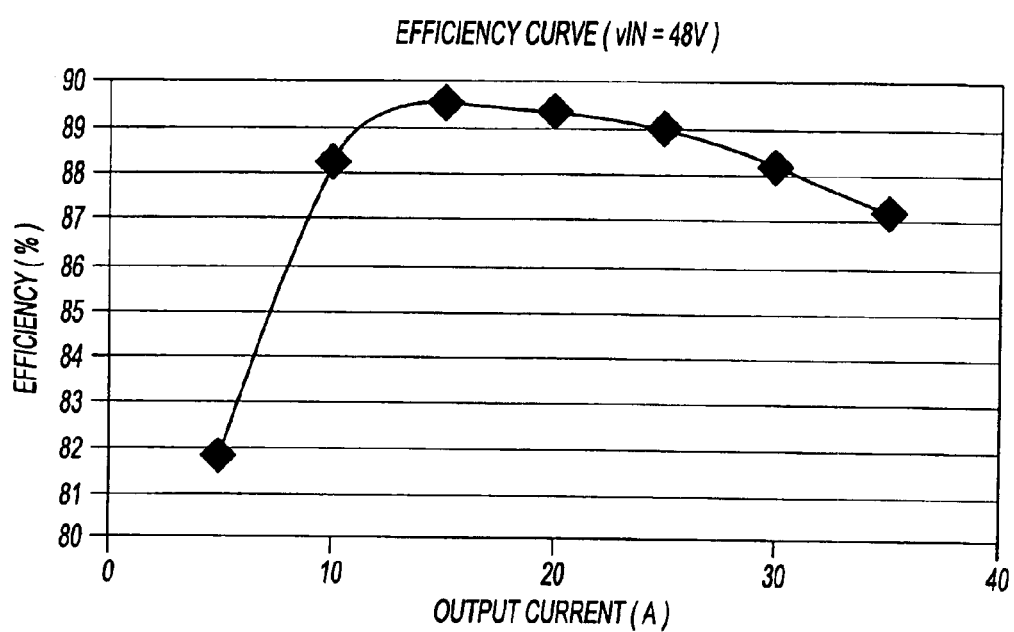
FIG. 4 is a graph showing the efficiency of a prototype of half-bridge DC—DC converter of FIG. 1.
Figure 5A:
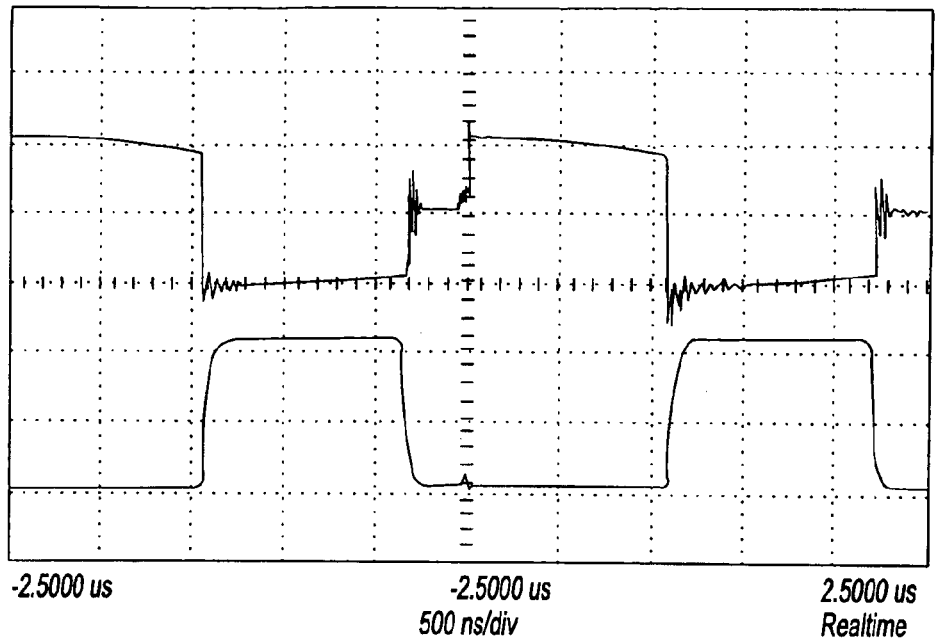
FIGS. 5A and 5B are the experimental waveforms of the prototype of FIG. 4.
Figure 5B:
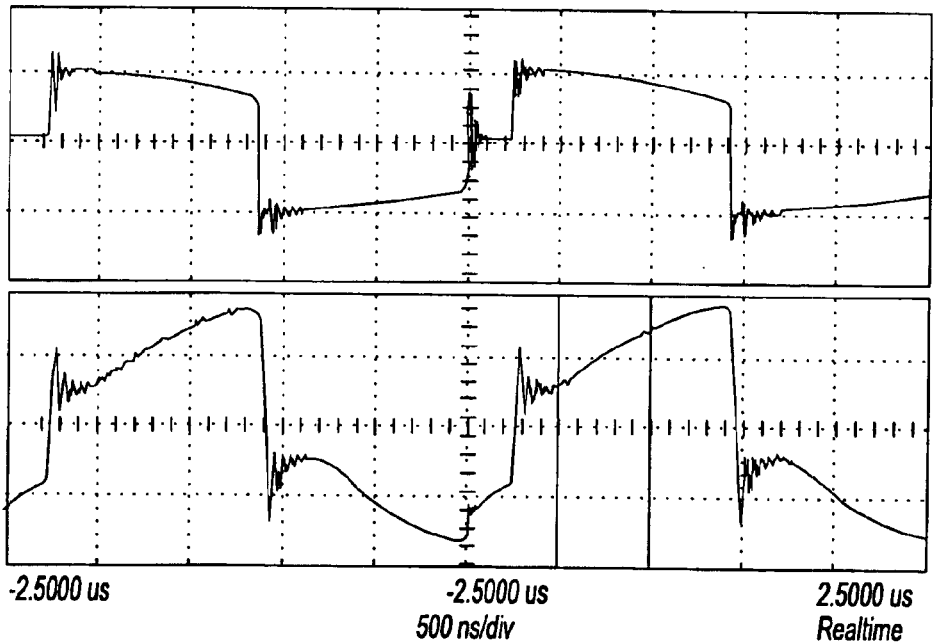

A quarter-brick prototype of half-bridge DC—DC converter having an output of 3.3V/35 A output and an input of 36~75V was built in accordance with the invention to verify the operation of the half-bridge DC—DC converter. Synchronous rectifiers were used on the secondary side 104 to reduce conduction losses. Two FETs were paralleled to provide primary switches $S_1$ and $S_2$. Operating at a switching frequency of 400 KHz with a 48V input, the efficiency of the prototype half-bridge DC—DC converter 100 is shown in FIG. 4 and the experimental waveforms for it are shown in FIGS. 5A and 5B.

Figure 6A:
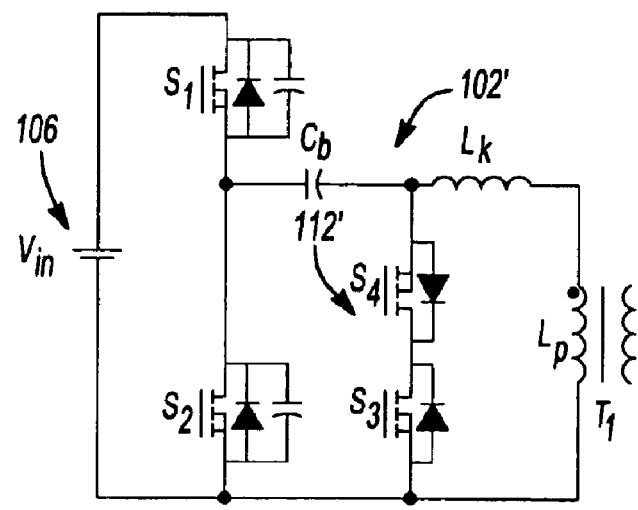
FIG. 6A is a schematic showing an alternative circuit topology for the primary side of the DCS half-bridge DC—DC converter of FIG. 1 where the auxiliary branch includes two switches.
Figure 6B:
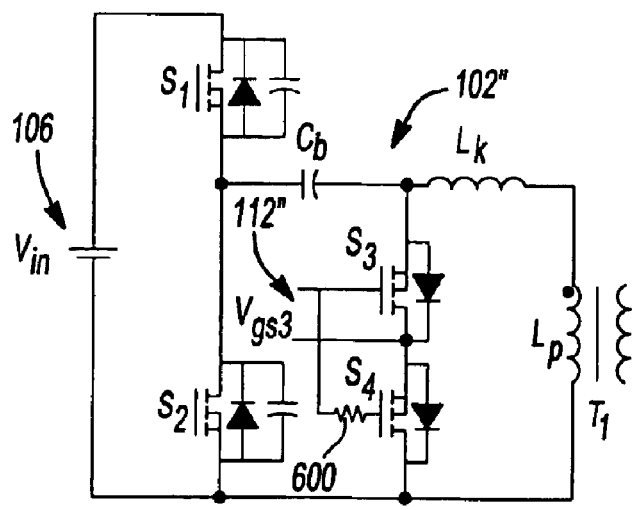
FIG. 6B is a schematic showing a variation of the circuit topology of FIG. 6A with the locations of the two switches in the auxiliary branch of FIG. 6A reversed and their gates coupled so that the two auxiliary switches can be driven with a common drive signal.
Figure 7A:
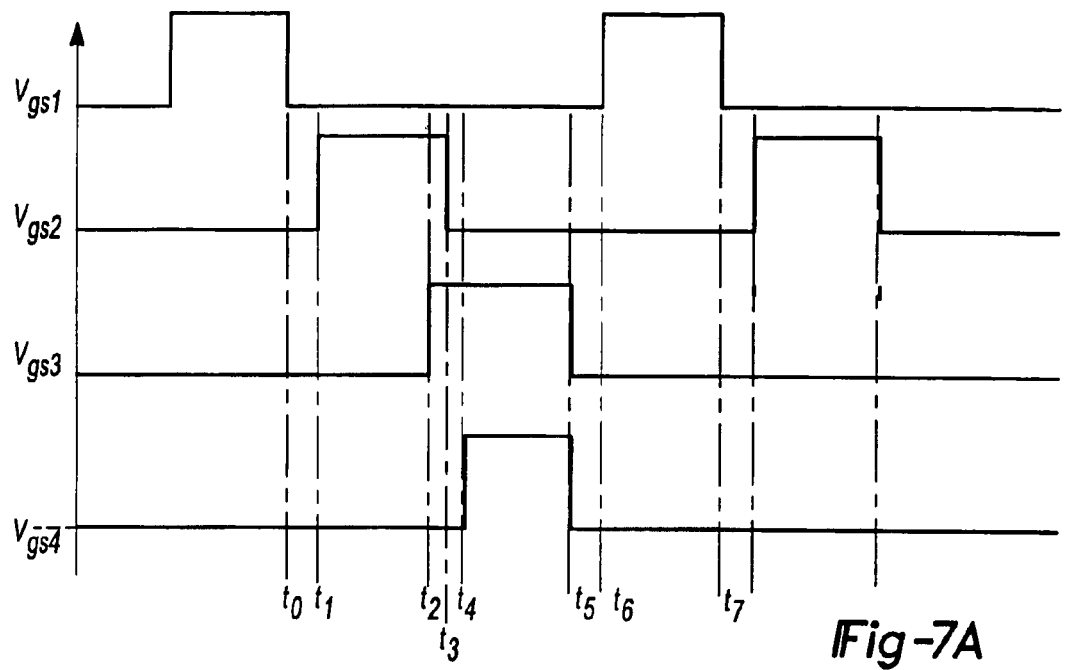
FIG. 7A shows key drive waveforms for the operation of the circuit topology shown in FIG. 6A.
Figure 7B:
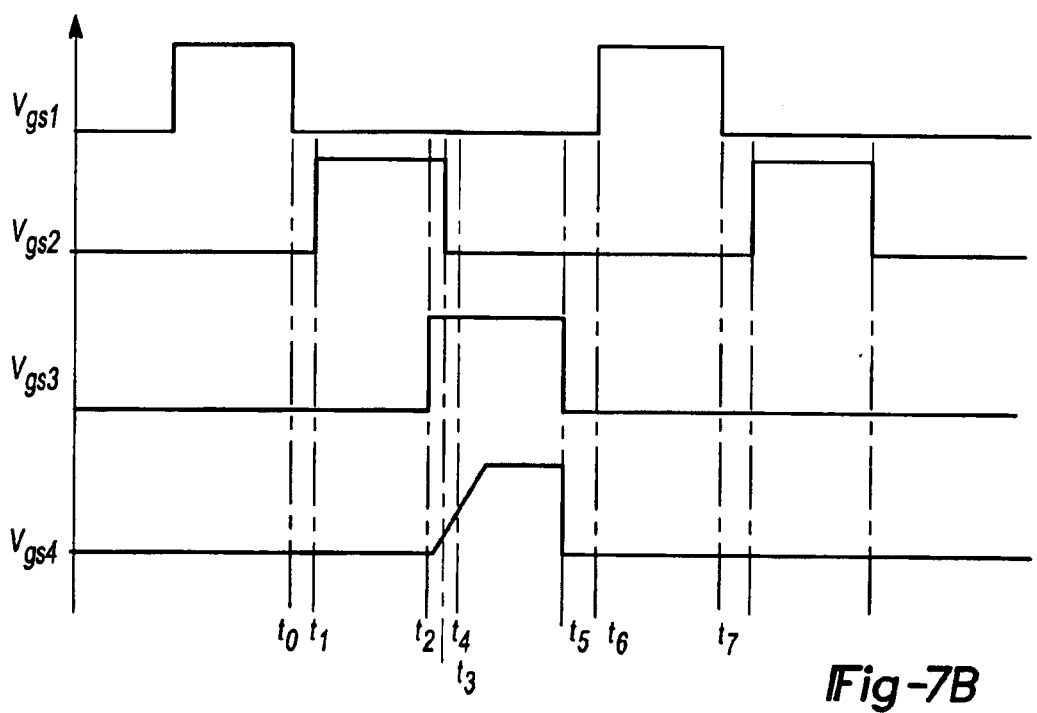
FIG. 7B shows key drive waveforms for the operation of the circuit topology shown in FIG. 6B.

FIG. 6A shows a variation 100' of primary side 100 of FIG. 1 where diode $D_3$ in auxiliary branch 112 is replaced by a switch to reduce conduction losses so that auxiliary branch 112' now includes series connected switches $S_3$, $S_4$. FIG. 7A shows the key switching waveforms for the topology of FIG. 6A. FIG. 6B shows a variation 112" of the auxiliary branch 112' topology of FIG. 6A where the locations of switches $S_3$, $S_4$ are reversed and their gates (switching inputs) are tied together through a resistor 600 so that switches $S_3$, $S_4$ can be driven with a common switching signal. FIG. 7B shows the key switching waveforms for the topology of FIG. 6B.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A half-bridge DC—DC converter, comprising:
   a primary side, a secondary side, and a transformer coupling the primary side to the secondary side;
   the primary side including first and second primary switches coupled to a primary winding of the transformer;
   an auxiliary branch having one side coupled to a junction of the first and second primary switches and a second side coupled to a common, the auxiliary branch including an auxiliary switch that is switched to a first state to trap leakage inductance energy of the transformer and switched to a second state to release the leakage inductance energy of the transformer to provide a zero voltage switching condition for one of the first and second primary switches.

2. The half-bridge DC—DC converter of claim 1 wherein the auxiliary switch is switched to the first state when one of the first and second primary switches is on and switched to the second state after that first and second primary switch is switched off to provide the zero-voltage switching condition for the other of the first and second primary switches.

3. The half-bridge DC—DC converter of claim 2 wherein the auxiliary switch is a grounded auxiliary switch.

4. The half-bridge DC—DC converter of claim 3 wherein the auxiliary switch is conducting in the first state and non-conducting in the second state.

5. The half-bridge DC—DC converter of claim 2 wherein the one of the first and second primary switches that is on when the auxiliary switch is switched to the first state is controlled with duty-cycle-shifted pulse width modulation to provide zero-voltage switching of that primary switch.

6. The half-bridge DC—DC converter of claim 1 wherein the first and second primary switches are switched at a high frequency switching rate and with the same duty cycle width.

7. The half-bridge DC—DC converter of claim 1 wherein the auxiliary branch further includes a diode in series with the auxiliary switch.

8. The half-bridge DC—DC converter of claim 1 wherein the auxiliary branch further includes a second switch in series with the auxiliary switch.

9. The half-bridge DC-Dc converter of claim 8 wherein switching inputs of the auxiliary switch and the second switch in series with the auxiliary switch are coupled together.

10. A half-bridge DC—DC converter, comprising:

a primary side coupled to a secondary side by a transformer;

the primary side including first and second primary switches switched at a high frequency and at the same duty cycle, a junction of the first and second primary switches coupled to a first side of a primary winding of the transformer, a second side of the primary winding of the transformer coupled to a common;

the second primary switch controlled with duty-cycle-shifted pulse width modulation to provide zero-voltage switching of the second primary switch;

an auxiliary branch coupled to the junction of the first and second primary switches and the common, the auxiliary branch including an auxiliary switch, the auxiliary switch switched on after the second primary switch is switched on to trap leakage inductance energy of the transformer when the second primary switch is switched off and the auxiliary switch is switched off to release the leakage inductance energy of the transformer to provide a zero voltage switching condition for first primary switch.

11. The half-bridge DC—DC converter of claim 10 wherein the auxiliary switch includes a MOSFET, a drain of the MOSFET of the auxiliary switch coupled to the junction of the first and second primary switches and a source of the MOSFET of the auxiliary switch coupled to the common.

12. The half-bridge DC—DC converter of claim 11 wherein the drain of the MOSFET of the auxiliary switch is coupled to the junction of the first and second primary switches by a diode having an anode coupled to the junction of the first and second primary switches and a cathode coupled to the drain of the MOSFET of the auxiliary switch.

13. The half-bridge DC—DC converter of claim 12 wherein the junction of the first and second primary switches is coupled to the primary windings of the transformer through a capacitor.

14. The half-bridge DC—DC converter of claim 13 wherein the first and second primary switches each include at least one MOSFET.

15. The half-bridge DC—DC converter of claim 10 wherein the junction of the first and second primary switches is coupled to the primary windings of the transformer through a capacitor.

16. The half-bridge DC—DC converter of claim 10 further including a controller for controlling the first and second primary switches and the auxiliary switch.

17. The half-bridge DC—DC converter of claim 10 wherein the first and second primary switches include at least one MOSFET, the junction of the first and second primary switches includes a source of the MOSFET of the first primary switch coupled to a drain of the MOSFET of the second primary switch.

18. The half-bridge DC—DC converter of claim 10 wherein the auxiliary branch includes a second switch in series with the auxiliary switch.

19. The half-bridge DC—DC converter of claim 18 wherein switching inputs of the auxiliary switch and the second switch in series with the auxiliary switch are coupled together.

20. A method of operating a half-bridge DC—DC converter having a primary side coupled to a secondary side by a transformer, the primary side including first and second primary switches coupled to a primary winding of the transformer, comprising trapping leakage inductance energy of the transformer in an auxiliary branch coupled to a junction of the first and second primary switches and a common and releasing it when the first and second primary switches are off to provide a zero-voltage switching condition for one of the first and second primary switches.

21. The method of claim 20 and further including controlling the other of the first and second primary switches with duty-cycle-shifted pulse width modulation to provide a zero-voltage switching condition for that switch.

22. The method of claim 21 wherein trapping leakage inductance energy of the transformer and releasing it includes trapping it by switching a grounded auxiliary switch in the auxiliary branch on when the primary switch controlled by duty-cycle-shifted pulse width modulation is on so that the leakage inductance energy is trapped when that primary switch is switched off and thereafter releasing the trapped leakage inductance energy by switching the auxiliary switch off.

23. The method of claim 22 and further including switching the first and second primary switches at a high frequency switching rate and with the same duty cycle width.

* * * * *